US012151829B2

(12) United States Patent
Smith et al.

(10) Patent No.: US 12,151,829 B2
(45) Date of Patent: Nov. 26, 2024

(54) EFFICIENT TURNAROUND SYSTEM FOR AIRCRAFT (71) Applicant: Overair, Inc., Santa Ana, CA (US)

(72) Inventors: Craig Smith, Laguna Niguel, CA (US); Peter Lyons, Albuquerque, NM (US)

(73) Assignee: Overair, Inc., Lake Forest, CA (US)

( * ) Notice: Subject to any disclaimer, the term of this patent is extended or adjusted under 35 U.S.C. 154(b) by 31 days.

(21) Appl. No.: 18/018,970

(22) PCT Filed: Aug. 5, 2021

(86) PCT No.: PCT/US2021/044731
§ 371 (c)(1),
(2) Date: Jan. 31, 2023

(87) PCT Pub. No.: WO2022/035681
PCT Pub. Date: Feb. 17, 2022

(65) Prior Publication Data
US 2023/0312133 A1 Oct. 5, 2023

Related U.S. Application Data (60) Provisional application No. 63/061,997, filed on Aug. 6, 2020.

(51) Int. Cl.
*B64F 1/22* (2024.01)
*B64F 1/35* (2024.01)

(52) U.S. Cl.
CPC . *B64F 1/22* (2013.01); *B64F 1/35* (2024.01)

(58) Field of Classification Search
CPC ... B64F 1/22; B64F 1/222; B64F 1/24; B64U 80/10
See application file for complete search history.

(56) References Cited

U.S. PATENT DOCUMENTS

| 3,785,316 A * | 1/1974 | Leming | B64F 1/24 74/89.32 |
|---|---|---|---|
| 10,059,465 B2 * | 8/2018 | Hoffstadt | B64F 1/02 |
| 10,836,510 B2 * | 11/2020 | Baury | B64F 1/22 |
| 10,974,849 B2 * | 4/2021 | Kim | B64F 1/007 |
| 11,414,209 B2 * | 8/2022 | Schonfelder | B64F 1/007 |
| 11,498,700 B2 * | 11/2022 | Hehn | B64C 39/028 |
| 11,873,116 B2 * | 1/2024 | Kozlenko | B64F 1/222 |
| 11,897,631 B2 * | 2/2024 | Kozlenko | B64U 70/30 |
| 11,897,632 B2 * | 2/2024 | Kozlenko | B64F 1/222 |
| 11,898,368 B2 * | 2/2024 | Blake | E04H 6/44 |

(Continued)

FOREIGN PATENT DOCUMENTS

| CN | 207985232 | 10/2018 |
|---|---|---|
| CN | 110239686 | 9/2019 |

(Continued)

OTHER PUBLICATIONS

International Search Report for International Patent Application No. PCT/US2021/044731, dated Apr. 18, 2022, 10 pages.

*Primary Examiner* — Joseph W Sanderson
(74) *Attorney, Agent, or Firm* — Fish IP Law, LLP (57) ABSTRACT

An aircraft landing platform for a passenger carrying aircraft has a landing module that is moveable between a landing position and a gate position, the landing module has a turntable that orients a door of aircraft to facilitate disembarkment of the passenger(s).

9 Claims, 9 Drawing Sheets

(56) References Cited

U.S. PATENT DOCUMENTS

| | | | |
|---|---|---|---|
| 2016/0229558 A1* | 8/2016 | Hoffstadt | B64F 1/06 |
| 2017/0050748 A1* | 2/2017 | Byers | H04L 67/12 |
| 2019/0002127 A1* | 1/2019 | Straus | B64U 50/37 |
| 2019/0177005 A1* | 6/2019 | Kim | B64U 50/38 |
| 2019/0270525 A1* | 9/2019 | Baury | B63B 35/50 |
| 2019/0270526 A1* | 9/2019 | Hehn | B64F 1/362 |
| 2019/0383052 A1* | 12/2019 | Blake | G08G 5/0069 |
| 2020/0023998 A1* | 1/2020 | Pawluski | B64F 1/222 |
| 2021/0107682 A1* | 4/2021 | Kozlenko | B64D 45/08 |
| 2021/0171214 A1* | 6/2021 | Schonfelder | G08G 5/0013 |
| 2021/0276733 A1* | 9/2021 | Kozlenko | B64U 70/30 |
| 2021/0276734 A1* | 9/2021 | Kozlenko | B64U 70/30 |

FOREIGN PATENT DOCUMENTS

| | | | | |
|---|---|---|---|---|
| GB | 2387156 A | * | 10/2003 | B64F 1/22 |
| KR | 101617593 | | 5/2016 | |
| KR | 20180046715 A | * | 5/2018 | |
| KR | 20200000200 | | 1/2020 | |
| WO | WO-2010145638 A1 | * | 12/2010 | B64F 1/007 |
| WO | WO-2022096410 A1 | * | 5/2022 | |

* cited by examiner

8002 Receive a signal that an aircraft is inbound and requires landing and turnaround facilities.

8003 Determine an optimal approach direction using wind direction.

8004 Send signal to the inbound aircraft containing information regarding the optimal approach direction.

8005 Determine an optimal landing module for the inbound aircraft.

8006 Command the determined landing module to move to the designated takeoff and landing position and rotate substantially aligned with the optimal approach direction.

8007 Command a landing module to move to the designated takeoff and landing position.

8008 Command the the landing module and charging station to move such that the charging plug is substantially aligned with the charging outlet on the aircraft.

8009 Command the landing module and charging station to move such that the charging plug is substantially aligned with the charging outlet on the aircraft.

8010 Command the charging plug to connect to the aircraft.

8011 Command the landing module to begin charging the aircraft.

8012 Command the landing module to move to the gate position.

*FIG. 8*

(Continued from Figure 8)    8001

| Receive weight signals from landing module scales. | 8013 |

| Determine whether the aircraft is safely loaded for flight. | 8014 |

| Send Signal to aircraft, for display to pilot, indicating that the aircraft is safely loaded. | 8015 |

| Command landing module to move to take off and landing position. | 8016 |

| Command charging station to disconnect from the aircraft and fold to stored configuration. | 8017 |

| Determine an optimal takeoff direction using wind data. | 8018 |

| Command rotatable portion of landing module to rotate to the determined ideal takeoff direction. | 8019 |

| Send signal to aircraft indicating the landing module is ready for aircraft takeoff. | 8020 |

FIG. 9

EFFICIENT TURNAROUND SYSTEM FOR AIRCRAFT

PRIORITY CLAIM

This application claims priority to U.S. provisional application having Ser. No. 63/061,997 (filed Aug. 6, 2020). These and all other extrinsic material discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is commercial aviation.

BACKGROUND

Almost all aircraft have some undercarriage provision for when the aircraft is on the ground. Fixed wing aircraft often have landing gear while historically rotorcraft have often used skids. While landing gear offers many nice features—for example the ability to taxi independently—landing gear is often complex, relatively heavy, and space consuming.

SUMMARY

In one embodiment a landing platform system using translating aircraft landing modules enables supported vehicles to reduce weight, costs, and complexity by use of simple undercarriage provisions other than landing gear. Additionally, such a system can increase operational efficiency by enabling inter-flight tasks to be undertaken before and after the aircraft is at the gate position—enabling a dramatic decrease in turnaround time.

DETAILED DESCRIPTION

Urban air mobility (UAM) aircraft—especially electric UAM aircraft—will initially have several constraints—one of them being the amount of onboard energy storage capacity. Due to the limited amount of energy storage capacity in current generation batteries, minimizing the weight of UAM aircraft is crucial. Weight savings will carry a premium value on UAM aircraft. One possible area to reduce weight and complexity is the aircraft's undercarriage.

Replacing complicated landing gear with skids can result in great benefits for UAM aircraft. However, in doing so the aircraft will no longer be able to taxi from a landing spot to a gate without external assistance.

At the same time, turnaround time will be of the utmost importance for the commercial viability of a UAM aircraft. By implementing a UAM landing platform with moveable landing modules, supported UAM aircraft can save on weight and complexity. Furthermore, the use of moveable landing modules has additional benefits including maximized vehicle uptime—especially for electric vertical take-off and landing (eVTOL) aircraft. The more time an aircraft can spend in the air transporting customers efficiently, the greater the likelihood of the aircraft's commercial success.

By enabling inter-flight tasks to be undertaken before and after the aircraft is at the gate position, operational efficiency can be greatly increased—enabling a dramatic decrease in turnaround time.

In some embodiments UAM will be operating in an evolving Air Traffic Management (ATM) environment intended for high-density flight operations. ATM is largely dependent on increased time precision to automate flight routes and increase potential throughput. The ability to decrease time variability in ground or flight operations is a critical aspect to increasing throughput in envisioned high-density air transit routes. The turnaround system—described in some embodiments herein—automates a large portion of the ground operations over self-taxi applications. The system can increase the precision for the entire ground operation by eliminating humanistic variables, such as taxi speed, taxi queuing, manual charge plugins and errors in taxi instruction. Increasing the precision of the ground operation—as described—will provide a fundamental benefit to ATM queuing and sequencing.

UAM vehicles will operate at vertiport locations with vastly reduced space over traditional airport taxiways; this increases the risk of wing or vehicle strikes to infrastructure or other vehicles, as it will be difficult for pilots to account for the large wing/prop span in small taxiways. The turnaround system—in some embodiments—can alleviate self-taxi risk of incidents occurring during taxi operations.

Over time, UAM operations will become more automated— reducing the need for pilot control—and may ultimately become fully autonomous. Automating the system by a guided rail, enables a much more practical method to automate ground operations over vehicle-controlled autonomy.

Figure 1:
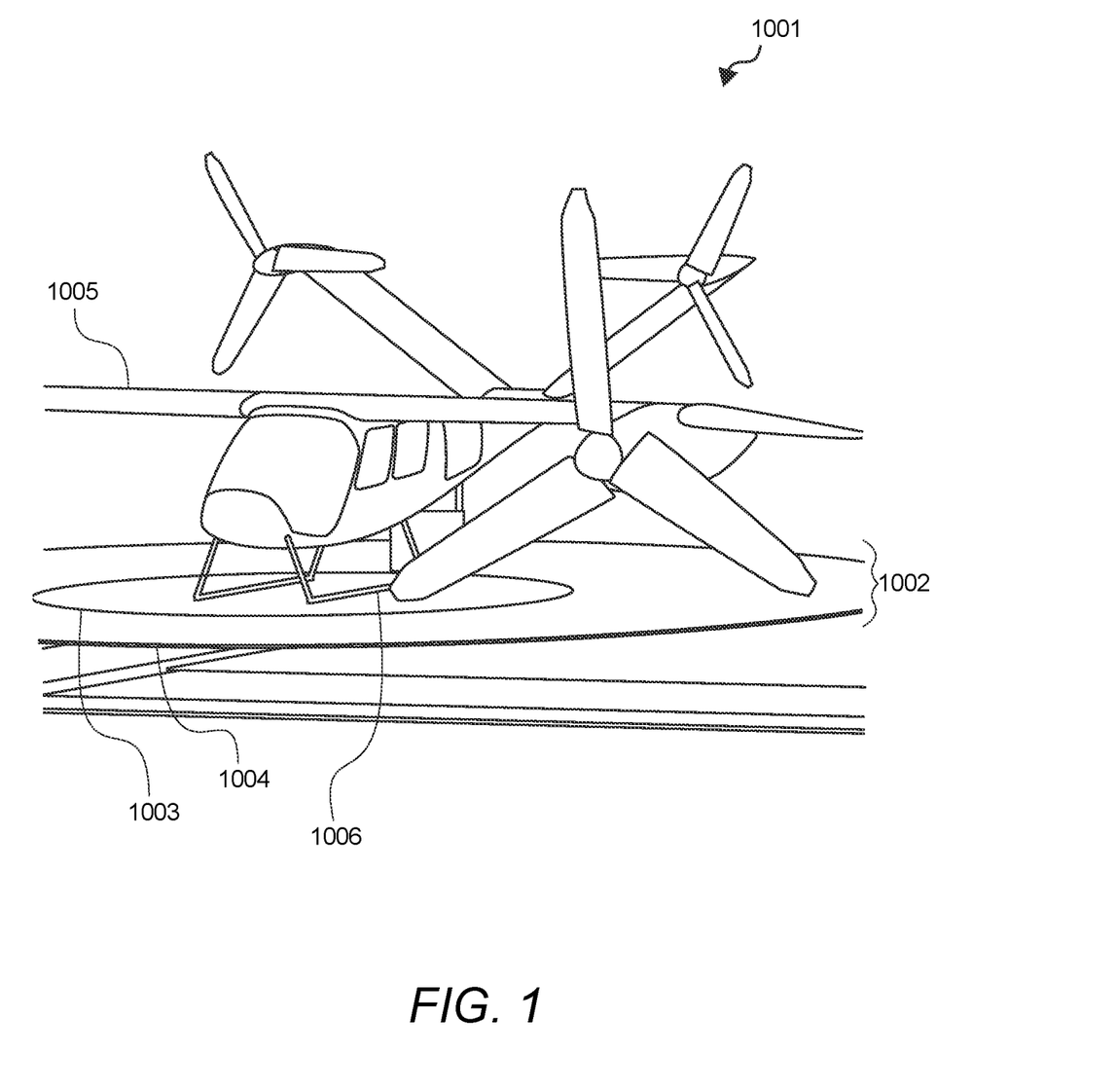
FIG. 1 shows one embodiment of a landing platform with an aircraft parked on a landing module.

FIG. 1 depicts one embodiment of a UAM landing platform 1001 comprising a landing module 1002. In the embodiment of FIG. 1, the landing module 1002 has an inner rotatable portion 1003 and an outer non-rotatable portion 1004.

Figure 2:
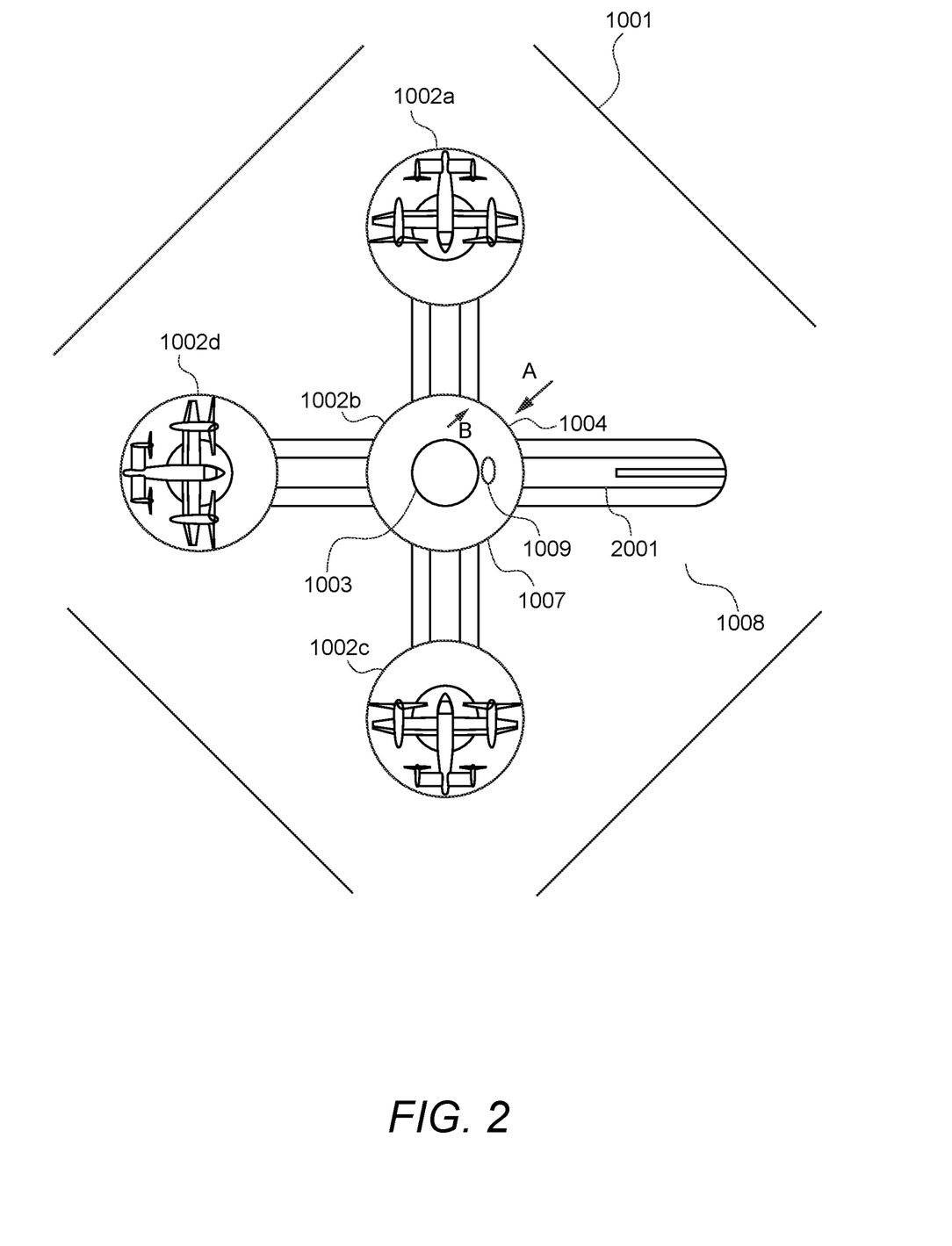
FIG. 2 shows an embodiment of a landing platform.

FIG. 2 shows an embodiment of an UAM landing platform 1001. The embodiment of FIG. 2 shows four landing modules 1002. Landing module 1002a is shown in the landing and takeoff position 1007. The other landing modules 1002a, 1002c, and 1002d are in the gate positions 1008.

Landing module 1002 may be moved to the landing position 1007. The aircraft may land in a direction best suited to that aircraft under the particular conditions at the time of landing. For example, the aircraft may be suited to land into a head wind. If at the time of landing the wind is blowing in a direction "A" at the time of vehicle approach, an approaching aircraft could land into the wind—the front of the aircraft pointing in the direction of "B".

Upon aircraft landing, the inner portion 1003 may rotate around and align the tail of the aircraft with the onboard charging station 1009. The charging station 1009 will be positioned on the outer ring in an orientation such that when the station 1009 is aligned with the tail of the aircraft, the aircraft will also be in the desired orientation for loading and unloading.

Figure 3:
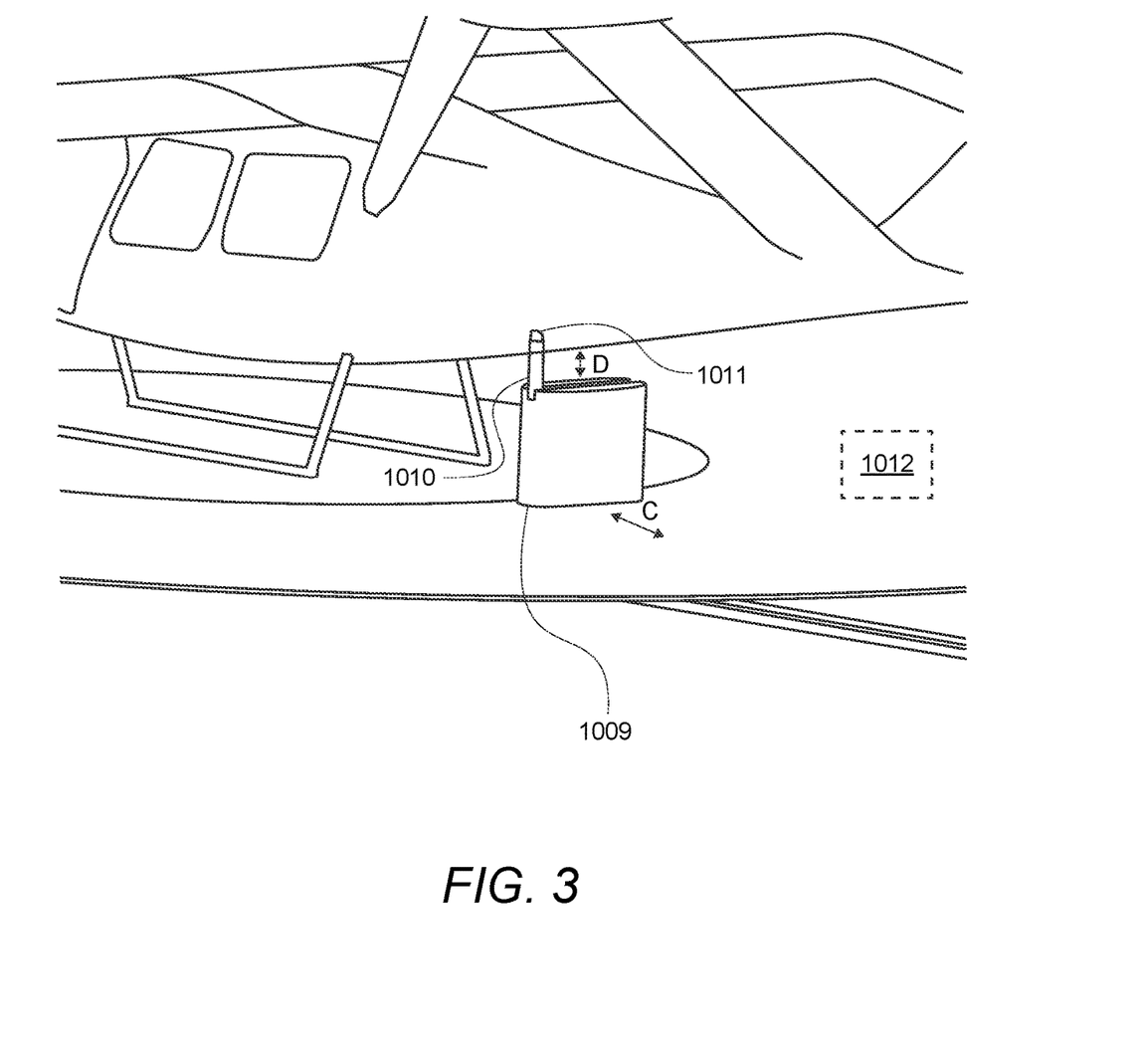
FIG. 3 shows an embodiment of a landing platform and an integrated charging station.

Landing module onboard charging station 1009—shown in FIG. 3—may be configured with charging plug arm 1010 that is configured to plug into aircraft charging port 1011. After folding up, the charging plug arm 1010 extends out, parallel to axis "D", and automatically plugs into charging port 1011.

In the embodiment of FIG. 3, the charging station 1009 can move along a radii "C" to facilitate alignment with the aircraft charging port. The base of the charging station may optionally raise or lower to facilitate charging.

In other embodiments, the charging station 1009 may be configured to fold flush against the main surface of outer landing module portion 1004. Any other design of automatic charger may be used—such as those that are designed for automotive EV charging.

Any suitable method of automatic alignment and connecting can be used—referring to the charger and charge port on the aircraft. Especially preferred embodiments comprise optical alignment sensors. Other embodiments may comprise radio frequency emitters and receivers to facilitate alignment; image recognition; or any other suitable tool for aligning the charger and the charge port. In especially preferred embodiments the inner rotatable portion 1003 may rotate to facilitate alignment between the charger and the charge port on the aircraft. The charge station will then move along a radii "C" and the arm will extend vertically—parallel to "D"—to finish connecting to the charge port on the aircraft. However, in other embodiments just the charging station 1009 will move during the alignment process and the rotation of the inner portion will not be used for charger alignment purposes.

While especially preferred embodiments will have automated onboard charging stations 1009, some charging modules will merely have a plug that can be plugged in manually— but will still serve to charge the aircraft during taxiing.

Figure 5:
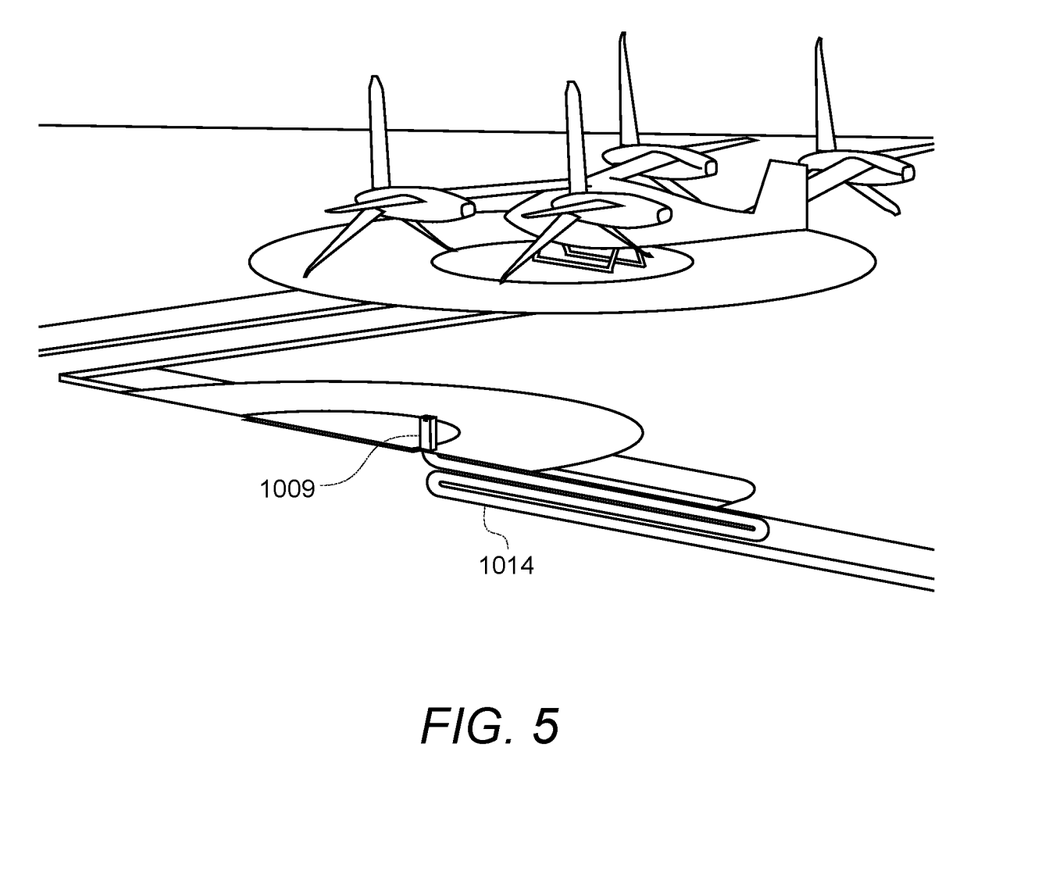
FIG. 5 shows a cutaway of a landing platform and a conduit for housing power wires.

The landing module 1002 receives power—in especially preferred embodiments—from the fixed portion of the charging platform 1001. Especially preferred embodiments use a wire track such as wire track 1014 illustrated in FIG. 5 to provide power to the landing module. The wire track may also serve as a conduit for anything else required by the aircraft between flights including water, fuel, air, data connections.

However, other embodiments may provide power to the landing module any other way for example by way of an electrified rail, telescoping rail, or merely wires properly configured to provide power to the module while the landing module is moving between the landing position and the gate position. Still in other embodiments, the landing module may have onboard battery systems that provide power to the landing module and provide sufficient power to charge the aircraft.

As soon as the aircraft is aligned with the onboard charging station 1009, the onboard charging station is plugged into the aircraft.

While especially preferred embodiments comprise a charging station on an outer non-rotating portion of the landing module, in other implementations the charging module may be located anywhere on the landing module 1002. For example, the inner portion may comprise one or more charging stations. In such an embodiment, the charging station may be configured to move around the landing module—by rotation or otherwise—to align with the charging port on the aircraft.

The immediate commencement of charging is critical to quick turnaround. A limiting factor of initial efficient eVTOL UAM aircraft operation will be the charging time. One benefit of a landing module with onboard charging is the ability to use taxiing time for vehicle recharging.

The landing module may translate towards gate position 1008—shown in FIG. 2. Once the landing module 1002 is at the gate position, the passengers may disembark, and the cargo may be unloaded. Meanwhile the aircraft will continue recharging. The next group of passengers and cargo may be loaded onto the aircraft while the aircraft is still charging. While the aircraft is moving between the landing position and the gate position, the landing platform can be capable—in some embodiments—of charging a passenger carrying electric vehicle at least five percent, at least ten percent, at least fifteen percent, or any other suitable percentage of total vehicle charge capacity.

In the embodiment of FIG. 2, landing module 1001 uses rails 2001 along which guide wheels of landing module 1002 move. Inner rotatable portion 1003 has a second guide wheel and rail system between subassemblies of inner rotatable portion 1003 that allows portions of the inner rotatable portion to rotate. A motor may drive the inner portion rotationally. Furthermore, a motor may be configured to cause the landing module 1002 to translate to and from the gate position. However, any combination of suitable translation and/or rotation systems may be used.

Figure 4:
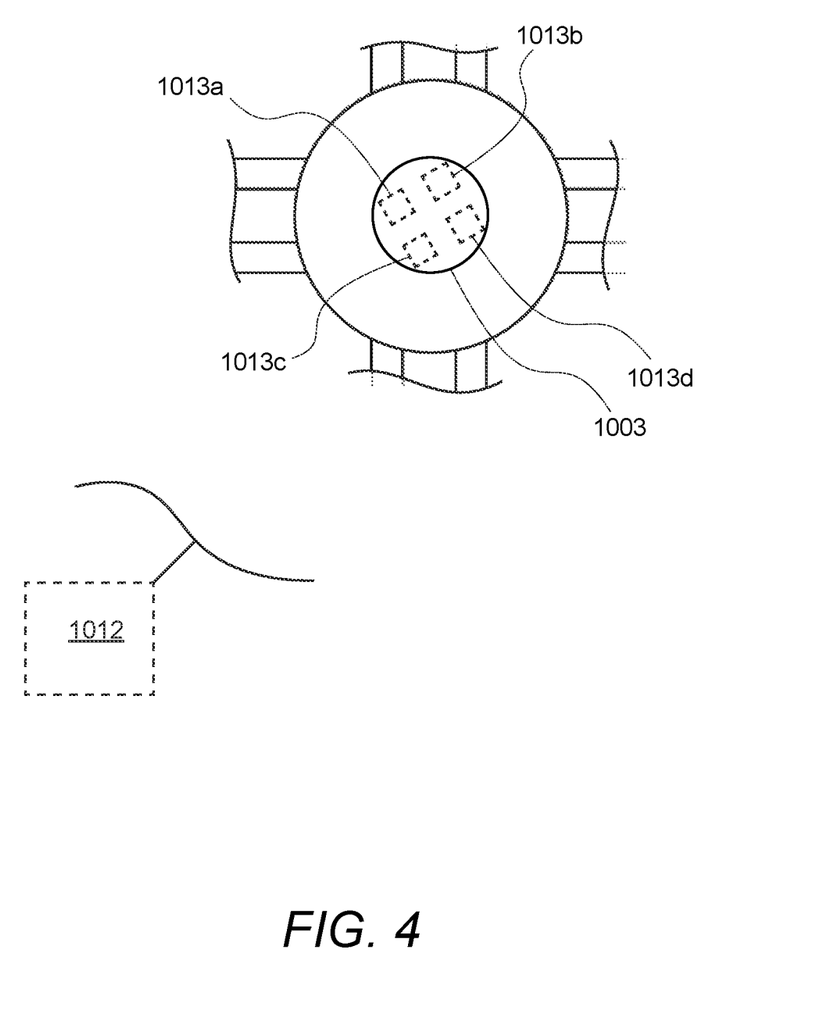
FIG. 4 illustrates and embodiment of a landing platform comprising weight sensors.

In especially preferred embodiments, the landing module 1002 comprises one or more weight sensors 1013, as shown in FIG. 4. Proper vehicle loading—passengers, cargo, pilots, etc.—will be critical to ensure safe and sufficient vehicle performance during flight. By incorporating one or more weight sensors 1013 on the inner rotatable portion 1003 of the landing gear module 1002, proper total weight as well as proper weight distribution may be ensured. Some embodiments may have simple weight sensors with readouts. In other embodiments, electronic vehicle operations system 1012 may ensure proper vehicle loading. The electronic vehicle operations system 1012 may receive signals from weight sensors 1013*a*, 1013*b*, 1013*c*, and 1013*d*. Electronic vehicle operations system 1012 may then determine, using the received signals, that the aircraft is or is not properly loaded for safe and optimal flight. Any number of weight sensors 1013 may be used for example 1, 2, 3, 4 or more. While one scale is simple, different numbers of weight sensors have advantages for determining weight distribution. An especially preferred embodiment uses 4 weight sensors underneath a flat top plate. Such a configuration allows for determination of the vehicle's balance, but also allows the landing platform to be capable of serving vehicles with different configurations—skid undercarriage, various landing gear undercarriages, etc.

Electronic vehicle operations system 1012 may use the data from the four sensors to compute the weight distribution on the aircraft. Once an aircraft lands and is rotated around into alignment with the charging station 1009, the electronic vehicle operations system 1012 will have information regarding the orientation of the aircraft and can compute the aircraft's weight distribution at that point. Once the aircraft is unloaded, the electronic vehicle operations system 1012 may receive information from weight sensors 1013 regarding the vehicle's empty weight and weight distribution. Once the vehicle is loaded, the electronic vehicle operations system 1012 receives information from the weight sensors and may again compute—using the received information and information regarding the orientation of the aircraft—the balance of the aircraft.

Electronic vehicle operations system 1012 may notify the pilot, ground crew team member, or passenger that the aircraft is improperly loaded. Alternatively—if the aircraft is not overloaded, but merely loaded improperly—the system may communicate with a system onboard the aircraft to automatically redistribute mass.

Figure 6:
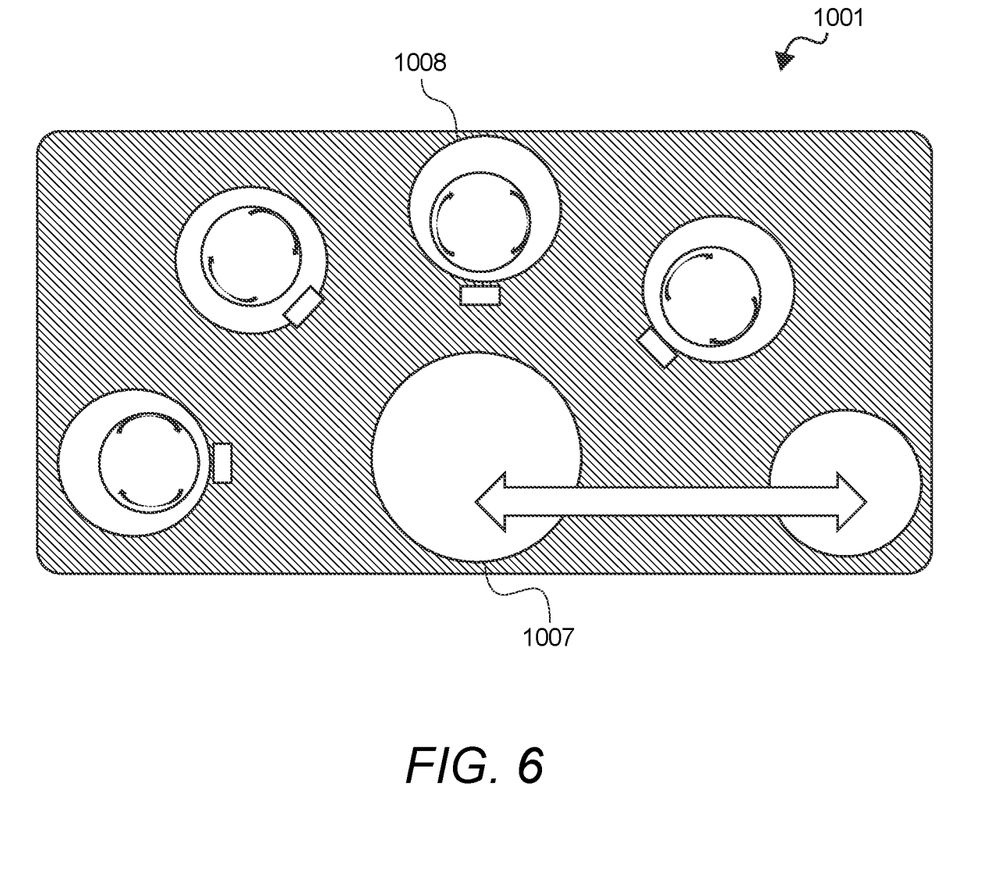
FIG. 6 shows a diagram of one embodiment of a landing platform system.

FIG. 6 illustrates an embodiment of an UAM landing platform 1001 comprising five gate positions 1008. It should be understood that any number of landing positions, gate positions, and landing modules may be used. Embodiments of landing platforms may comprise a plurality of landing positions—each landing position having a plurality of associated gate positions and landing modules. Furthermore, in some embodiments the landing modules are not limited to one particular landing position or gate position. A landing module may be configured to be capable of moving between multiple landing positions and/or gate positions.

Figure 7:
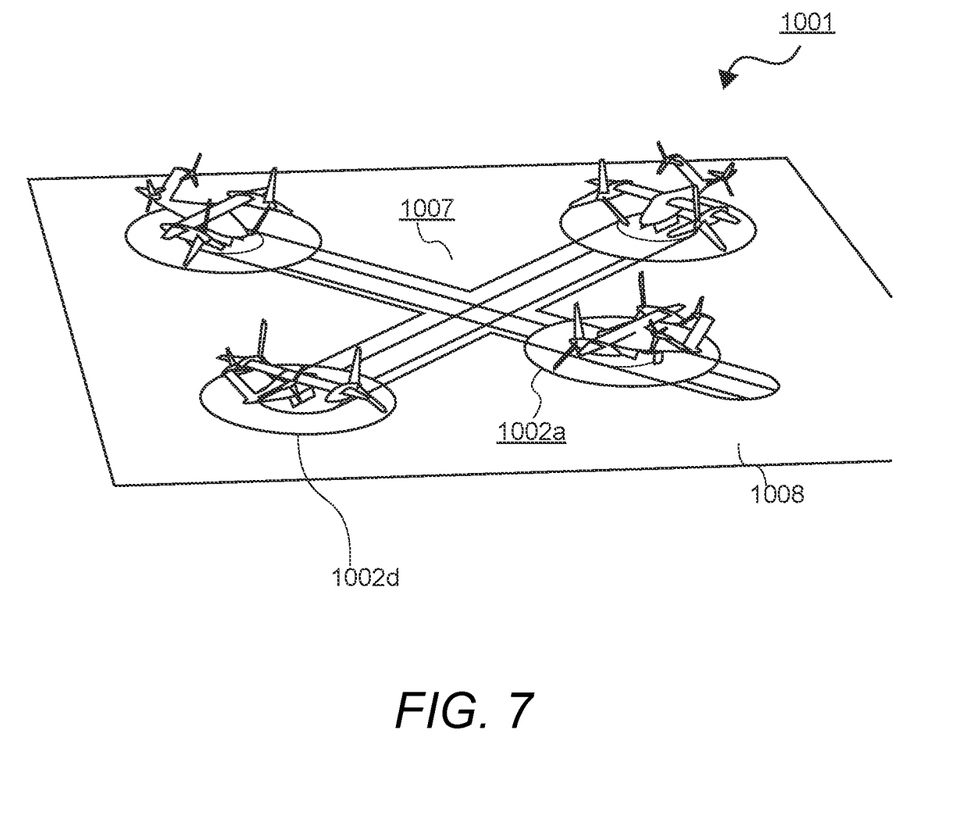
FIG. 7 illustrates an embodiment of a landing platform system.

FIG. 7 illustrates a perspective view of an UAM landing platform 1001. The embodiment of UAM landing platform 1001 shown in FIG. 7 comprises landing modules 1002 and gate position 1008. Landing module 1002a is shown in transit between the landing position 1007 and gate position 1008.

Figure 8:
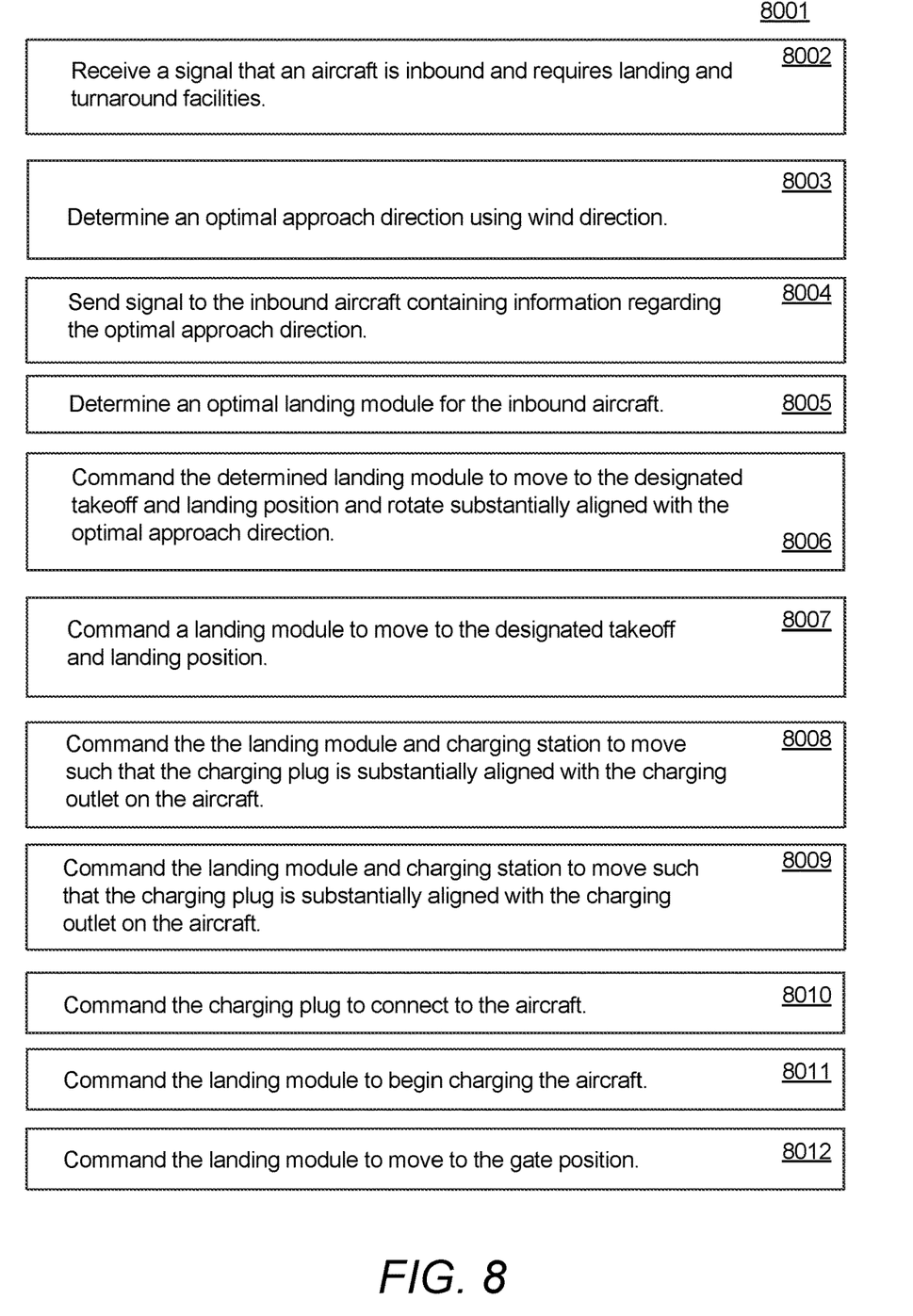
FIGS. 8 and 9 depict a flow chart for one possible method of operating an embodiment of a landing platform system.
Figure 9:
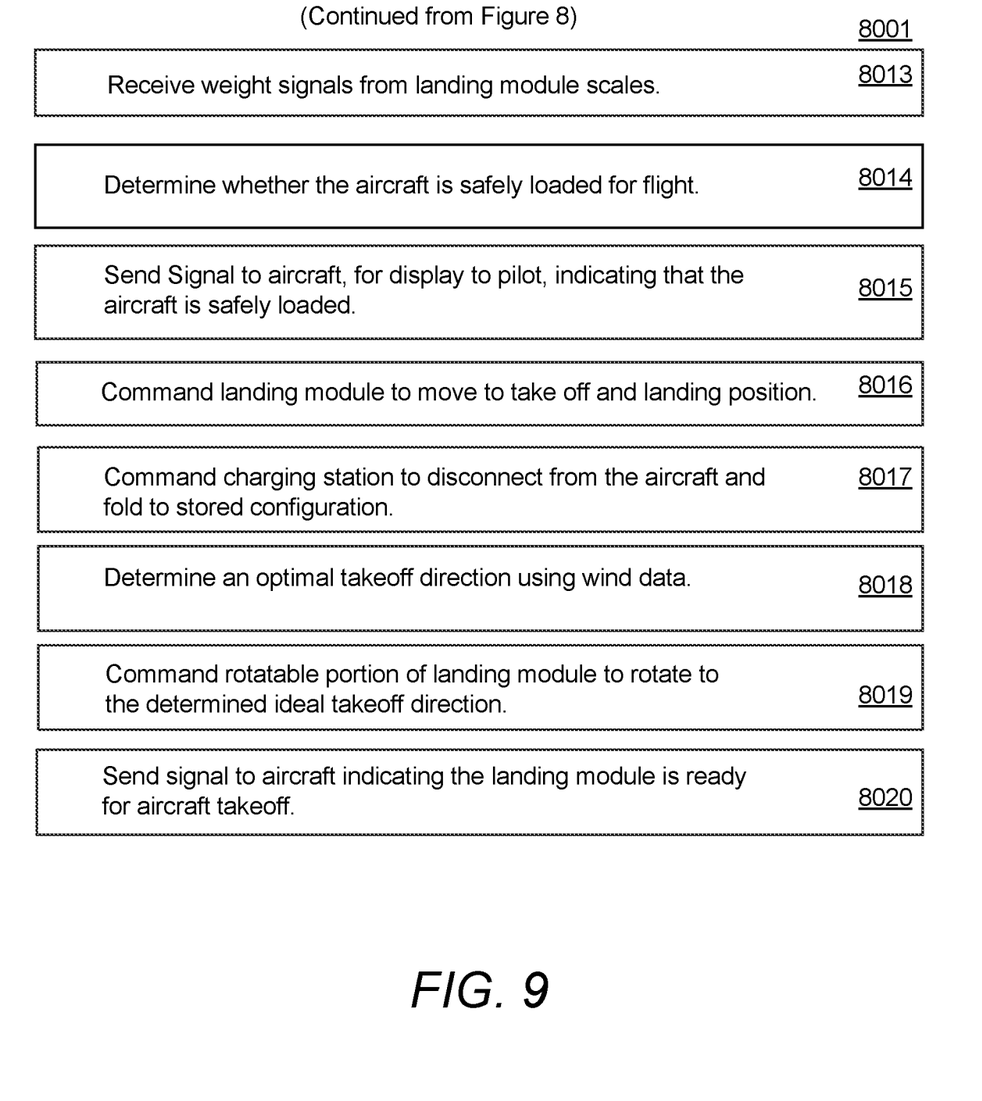

FIGS. 8 and 9 show steps that could be carried out—by electronic vehicle operation system 1012 or otherwise—to efficiently turn around an aircraft.

While many of the embodiments discussed herein comprise rail systems for landing module movement, any suitable translation provision may be used including: wheels, sliding modules, a roller bed platform—such as the type used inside air cargo aircraft—or modules that pivot using a swing arm. In an embodiment comprising a roller bed type arrangement, the provision for automated guiding may be implemented on either the floor side or the module side. For some applications, the roller bed arrangement may be advantageous because it could be configured such that the landing module could have multiple degrees of freedom of motion.

Embodiments that use landing modules with wheels—and do not use rails—could be especially well suited for UAM landing locations located at large airports. Wheeled versions could be equipped with onboard energy provisions—such as generators or batteries—to allow them to be self-contained to some degree.

Self-contained embodiments could be equipped to start unloading bags during the module's translation to the gate position. For aircraft configurations with storage beyond "carry on" storage, the aircraft could begin to unload the luggage onto a cart or container on the module. Likewise loading of luggage or other cargo onto the aircraft could be completed while the aircraft is being translated from the gate position to the landing and takeoff position. Use of landing modules could be especially useful in applications where standardized cargo or luggage containers are used. The landing module 1002 could comprise a loading arm or other system such that could work to unload or load containers while the aircraft is being translated from the landing and takeoff position to the gate position.

Landing modules enable efficiency by enabling inter-flight tasks to be undertaken before and after the aircraft is at the gate position—allowing a dramatic decrease in turn-around time. Tasks such as charging, weighing, weight re-distribution, cargo loading and unloading, can be—at least partially—completed during translation of the aircraft from the landing and takeoff position to the gate position.

While many embodiments herein focus on UAM related applications, it should be noted that concepts herein may be equally applicable to other applications—for example cargo transport hubs, remote outposts, or ship-based applications. Embodiments of the system could even be useful for fixed wing aircraft operation—modules could be used to begin inter-flight tasks such as charging while the aircraft is in translation from the runway to the gate and from the gate to the runway.

It should be noted that any language directed to an electronic vehicle operations system should be read to include any suitable combination of computing devices, including servers, interfaces, systems, databases, agents, peers, engines, controllers, or other types of computing devices operating individually or collectively. The computing devices may comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed above with respect to the disclosed apparatus. In some embodiments, various servers, systems, databases, or interfaces may exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

Aspects of the electronic vehicle operations system may be located somewhere at a landing facility where the landing platform is, or anywhere else including in a ground-based control center, on an aircraft, or even in a remote computer location. Furthermore, in some embodiments the electronic vehicle operations system may be implemented in distinguishable units or may be combined in one unit.

The invention claimed is:

1. An aircraft landing platform configured to charge a passenger carrying electric vehicle having a passenger door, the landing platform comprising a landing module that is moveable between a landing position and a disembarkment gate position of the aircraft landing platform, wherein the landing platform is configured to rotate the passenger door relative to the disenbarkment gate position, and wherein the landing module comprises a charging station.

2. The aircraft landing platform of claim 1 wherein the charging station is capable of increasing the charge level of a passenger carrying electric aircraft by at least five percent of a total charge capacity of the passenger carrying electric aircraft.

3. The aircraft landing platform of claim 2 wherein the charging station is capable of increasing the charge level of a passenger carrying electric aircraft by at least five percent of a total charge capacity of the passenger carrying electric aircraft while the landing module is moving between the landing position and the gate position.

4. The aircraft landing platform of claim 1 wherein the landing module is configured to rotate the aircraft.

5. The aircraft landing platform of claim 1 wherein the landing module comprises a weight sensor.

6. The aircraft landing platform of claim 1 further comprising a track system configured to guide the landing module between the landing position and the gate position.

7. The aircraft landing platform of claim 1 wherein the landing module comprises an onboard battery configured to provide power to an integrated charging system.

8. The aircraft landing platform of claim 1 wherein the landing platform is configured such that the landing module is autonomously moveable between the landing position and the gate position of the aircraft landing platform.

9. A method for operating a passenger carrying VTOL aircraft, the method comprising the steps of:
- landing the aircraft on a movable landing module while the moveable landing module is at a landing position of an aircraft landing platform;
- beginning to charge the aircraft while the aircraft is on the movable landing module;
- rotating a door of the aircraft to a desired disenbarkment gate orientation;
- causing the moveable landing module to move to a gate position of the aircraft landing platform; and,
- docking the moveable landing module at the gate position of the aircraft landing platform.

* * * * *